United States Patent [19]
Hellriegel et al.

[11] 3,791,693
[45] Feb. 12, 1974

[54] VEHICLE DOOR, IN PARTICULAR FOR MOTOR VEHICLES

[75] Inventors: Emund Hellriegel, Cologne; Dieter Pfadenhauer, Pulheim, both of Germany

[73] Assignee: Ford Motor Company, Dearborn, Mich.

[22] Filed: Mar. 13, 1972

[21] Appl. No.: 234,228

[30] Foreign Application Priority Data
June 14, 1971 Germany............... P 21 27 724.7

[52] U.S. Cl..................... 296/146, 49/503, 293/63
[51] Int. Cl............................................... B60j 5/04
[58] Field of Search. 296/146, 153; 293/63; 49/502, 49/503

[56] References Cited
UNITED STATES PATENTS
2,005,198   6/1935   Morrison .................. 296/146 X
3,258,877   7/1966   Peras ........................... 49/502
3,387,881   6/1968   Stepanek et al. ............ 296/153

FOREIGN PATENTS OR APPLICATIONS
725,638   9/1942   Germany

Primary Examiner—David Schonberg
Assistant Examiner—Leslie J. Paperner
Attorney, Agent, or Firm—Keith L. Zerschling; John J. Roethel

[57] ABSTRACT

A vehicle door, in particular for motor vehicles, having a load-bearing cross-member linking the door hinges and the door lock, to which frames, guides and actuator devices for windows, as well as armrests, handles and actuating devices for the door lock, are attached. The cross-member is attached to flat sheet-metal or synthetic material components forming the internal and external panels of the door.

14 Claims, 4 Drawing Figures

PATENTED FEB 12 1974 3,791,693

VEHICLE DOOR, IN PARTICULAR FOR MOTOR VEHICLES

BACKGROUND OF THE INVENTION

Vehicle doors of the kind introductorily described are already known from German patent documents Nos. 1 455 812 and 1 480 089 as laid open for inspection. The load-bearing cross-members linking door hinges and door lock, here take the form of X-shaped or Y-shaped flat sheet-metal pressings of flat aluminum castings. These known cross-members were fully capable of withstanding the stresses and strains produced by the hinge and lock loadings during operation of the vehicle door.

The ever-increasing demands nowadays made upon the passive security of a motor vehicle, mean, as far as a modern vehicle door is concerned, that in the event of a sideways collision with another vehicle, the passenger space has a degree of lack of protection which prevents the dangerous penetration of parts of the vehicle body.

In conventional vehicle doors, it is already known to arrange between the internal and external panels of the door, a horizontally disposed side protection member with a box section. These solutions to the lateral protection problem have the drawback that the space between the internal and external panels of the door restricts the respective width of any lateral protection member. Furthermore, the vertical double walls located in the neighborhood of the lateral protection member, these walls being formed by the internal panel of the door and the parallel inside surface of the protection member itself, and by the external panel of the door and the parallel outside surface of the protection member, do not substantially improve the lateral stiffness in proportion to the increased weight resulting from such construction.

It is the object of the invention to create a modern vehicle door which matches the stringent requirements in terms of effective lateral protection of the passsenger space. The requisite lateral stiffness, coupled with the lowest possible installed weight, is achieved by a large horizontal width on the part of the protection member.

SUMMARY OF THE INVENTION

In accordance with the invention, the objective is achieved in that a horizontally disposed lateral protection member carrying a door hinge at one end and a door lock at the other, has a box cross-section of substantial horizontal width, one side of which directly forms part of the external panel of the door, and the other side of which directly forms part of the internal panel of the door, which internal panel has the recessed finger grips, armrests, air distribution devices and the like molded in it, the member furthermore carrying upper and lower frame sections, constituted by profiled bars.

The upper frame section can in this context carry a transparent pane of glass or synthetic material, preferably with a communicating window, while the lower frame section will either likewise take a transparent pane or an opaque panel.

That side of the lateral protection member which forms the internal panel of the door in which the finger grips, armrests and the like are molded is here provided with a foam liner the shaped surface of which directly constitutes the internal trim of the door.

The lateral protection member can here be constituted by two sheet-metal pressings of substantially U-shaped cross-section, the cavity of the member being filled with energy-absorbing material.

The side protection member, however, can equally well be constituted by an external extruded aluminum profiled strip and an internal sheet-metal pressing of U-shaped cross-section. The aluminum profiled strip can in this context form part of the window frame.

The lateral protection member can also, however, be constituted by a single aluminum casting or die casting. The lateral protection member can have the window frame formed in situ with it if it is made of an aluminum plastic.

The foam liner can in this context contain passages, discharge nozzles and the like, associated with the air distribution system of the motor vehicle.

The foam lining can furthermore contain sealing profiles for the frame sections carried by the lateral projection member.

Due to the arrangement and design of the lateral protection member in accordance with the invention, the maximum width of the vehicle door, inclusive of the wide armrests, can be fully exploited, with the exception of the width of an effective synthetic foamed liner, for the horizontal width of the lateral protection member. The simultaneous exploitation of the vertical sides of the member as parts of the internal and external panels of the door enables a considerable saving in weight and cost to be achieved.

It will readily be appreciated that in modern, low-height motor cars, virtually a third of the external and internal panels of the door can be constituted by the lateral protection member in accordance with the invention. The design of the vehicle door in accordance with the invention as a door in which the windows cannot be lowered, constitutes the most economic solution for future vehicle models in view of the continuing tendency towards lower overall vehicle heights, increasing air pollution and the consequent necessity to install full air-conditioning with filtering, heating and cooling arrangements.

DESCRIPTION OF THE DRAWING

The invention will be explained in more detail making reference to an example illustrated in the attached drawings.

DETAILED DESCRIPTION OF THE INVENTION

Figure 1:
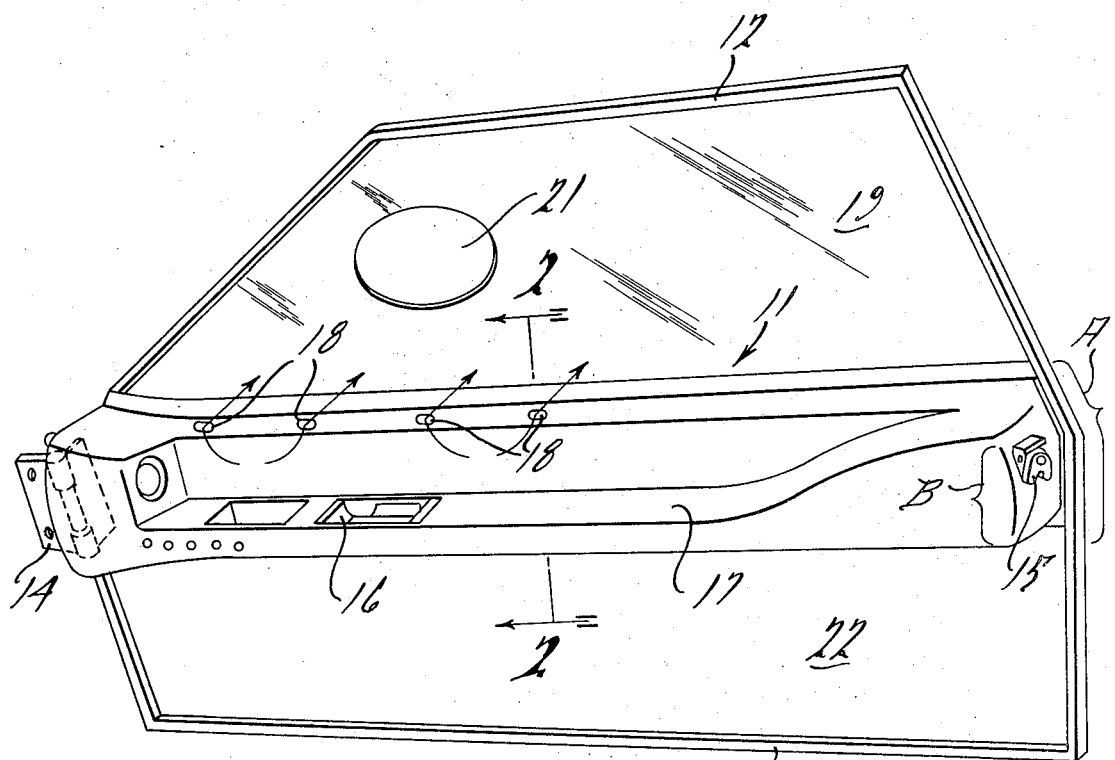
FIG. 1 illustrates a tilted view of a vehicle door in accordance with the invention, seen from the passenger space.

The vehicle door illustrated in FIG. 1 consists essentially of the horizontally disposed lateral protection member 11 which has a box cross-section of large horizontal width. The lateral protection member 11 has upper and lower frame sections 12 and 13 which are constituted by profiled bars.

The lateral protection member 11 is articulated at one end through a single wide door hinge 14 to the vehicle bodywork and is fitted with a latch mechanism 15 at its other end.

With one of its vertical sides, the member 11 directly forms a part A of the external door panel and with its other vertical side it directly forms a part B of the internal door panel which has the finger grips 16, armrests 17, air distribution outlets 18 and the like molded in situ in it.

The upper frame section 12 here accommodates a transparent pane 19 of glass or synthetic material, preferably containing a communicating window 21. The bottom frame section 13 can either be fitted with a transparent pane 22 in the same way, or with an opaque panel.

Figure 2:
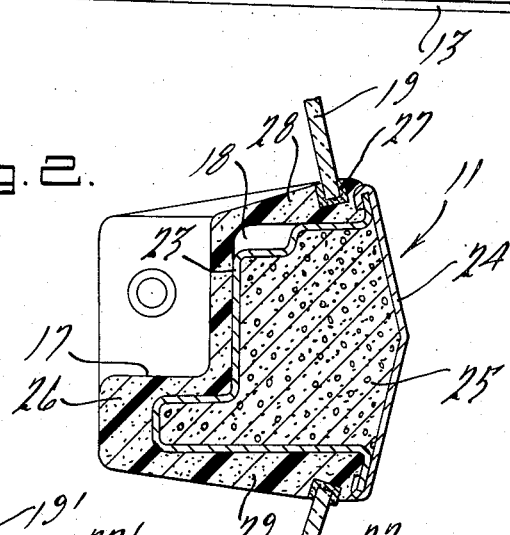
FIG. 2 illustrates a vertical section on the line 2—2 of FIG. 1.
Figure 3:
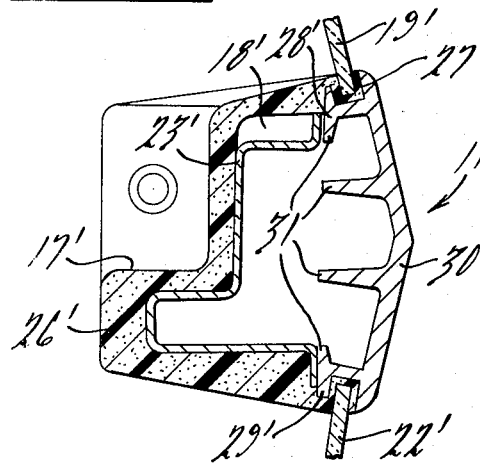
FIG. 3 illustrates a section similar to FIG. 2, disclosing a further embodiment of the lateral protection member.
Figure 4:
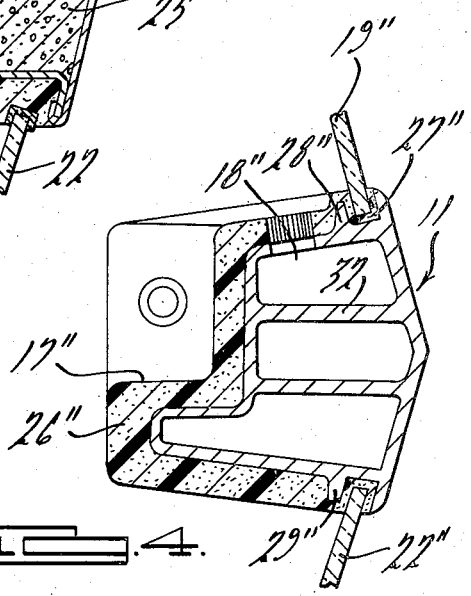
FIG. 4 illustrates a section similar to FIG. 2, disclosing a further embodiment of the lateral protection member.

The design of the vehicle door in accordance with the invention can most simply be described making reference to the vertical sections of FIGS. 2 to 4.

In FIG. 2, an embodiment of the lateral protection member 11 in accordance with the invention has been illustrated, showing it to consist of two sheet-metal stampings 23 and 24 of substantially U-shaped cross-section in each case, the cavity of the member possibly being filled with energy-absorbing material 25. The internal stamping 23 which forms part of the internal door panel, is provided with a foamed synthetic material liner 26 whose shaped surface directly constitutes the internal trim of the door. The foamed liner 26 embraces the entire internal surface of the lateral protection member 11 and defines passages, discharge nozzles and the like belonging to the air distribution system 18, as well as sealing profiles 27 for the upper and lower frame sections 28 and 29 carried by the member 1.

In FIG. 3, a further embodiment of the lateral protection member in accordance with the invention is illustrated, in which it consists of an external extruded aluminum profiled strip 30 and an internal U-section metal stamping 23'. The extruded aluminum profiled strip 30 is provided here with horizontal ribs 31 whose thickness and width are such that the member 11' has the requisite section modulus. The aluminum profiled strip 30 can here form part of the window frames 28' and 29'.

In FIG. 4, a further embodiment of the lateral protection member in accordance with the invention has been illustrated, this time consisting of a single gravity-cast or die-cast component 32 in aluminum, the window frames 28'' and 29'' being formed integrally with it.

In the embodiments of FIGS. 3 and 4, the other details of the lateral protection member arrangement have been marked by the same references used in FIGS. 1 and 2, the references in FIG. 3 having been given an ' and the references in FIG. 4 a ''.

In the embodiment of FIG. 3, the external surface of the profiled strip 30 can be employed directly to form part of the decoration of the vehicle side.

In the embodiment of FIG. 4, the lateral protection member 11'' can be produced in the form of a component in which all the fixing positions and locations for hinges, locks, operating levers and linkages etc., are provided.

From the foregoing, it will be apparent that the concentration of the material in lateral protection members which form part and parcel of the internal and external panels of the door, as proposed in accordance with the invention, achieves a door design for modern motor cars, which is space-saving, weight-saving and cost-saving.

We claim:

1. A vehicle door, in particular for motor vehicles, with a load-bearing cross-member linking the door hinges and the door lock, to which frames, guides and actuator devices for windows, as well as armrests, handles and actuating devices for the latch mechanism are attached, the cross-member being attached to flat components forming the internal and external panels of the door, characterized in that the cross-member comprises a horizontally disposed lateral protection member carrying a door hinge at one end and a door lock at the other, the cross-member having a box cross-section of substantial horizontal width the external side of which directly forms part of the external panel of the door and the internal side of which directly forms part of the internal panel of the door, the panel having recessed finger grips, armrests, and air-conditioning conduits molded in it, and the cross-member furthermore carrying upper and lower frame sections constituted by profiled means.

2. A vehicle door as claimed in claim 1, characterized in that the internal side of the lateral protection member, which forms the internal panel of the door and contains the recessed finger grips, and armrests molded in it, is provided with a foamed synthetic material liner whose shaped surface directly constitutes the internal trim of the door.

3. A vehicle door as claimed in claim 2, characterized in that the lateral protection member is formed by two substantially U-section sheet-metal stampings forming a cavity therebetween, the cavity within the protection member being filled with energy-absorbing material.

4. A vehicle door as claimed in claim 2, characterized in that the lateral protection member is constituted by an external profiled strip of extruded aluminum and an internal U-section metal stamping, the profiled aluminum strip forming part of the window frame.

5. A vehicle door as claimed in claim 2, characterized in that the lateral protection member consists of a single cast aluminum component with the window frames formed integrally with it.

6. A vehicle door as claimed in claim 2, characterized in that the energy absorbing liner defines passages, and discharge nozzles associated with an air distribution system.

7. A vehicle door as claimed in claim 2, characterized in that the energy absorbing liner forms sealing profiles for the frame sections carried by the lateral protection member.

8. A vehicle door as claimed in claim 1, characterized in that the upper frame section accommodates a transparent panel, the bottom frame section likewise containing a panel.

9. A vehicle door as claimed in claim 8, characterized in that the internal side of the lateral protection member which forms the internal panel of the door and contains the recessed finger grips, and armrests molded in it, is provided with a foamed synthetic material liner whose shaped surface directly constitutes the internal trim of the door.

10. A vehicle door as claimed in claim 9, characterized in that the lateral protection member is constituted by an external profiled strip of extruded aluminum and an internal U-section metal stamping,
the profiled aluminum strip forming part of the window frame.

11. A vehicle door as claimed in claim 9, characterized in that the lateral protection member consists of a single cast aluminum component with the window frames formed integrally with it.

12. A vehicle door as claimed in claim 9, characterized in that the lateral protection member is formed of two substantially U-section sheet-metal stampings forming a cavity therebetween,
the cavity within the protection member being filled with energy-absorbing material.

13. A vehicle door as claimed in claim 12, characterized in that the foamed liner defines passages, and discharge nozzles associated with an air distribution system.

14. A vehicle door as claimed in claim 13, characterized in that the energy absorbing foamed liner forms sealing profiles for the frame sections carried by the lateral protection member.

\* \* \* \* \*

UNITED STATES PATENT OFFICE
CERTIFICATE OF CORRECTION

Patent No. 3,791,693      Dated February 12, 1974

Inventor(s) Edmund Hellriegel and Dieter Pfadenhauer

It is certified that error appears in the above-identified patent and that said Letters Patent are hereby corrected as shown below:

[75] Emund Hellriegel should read Edmund Hellriegel

Signed and sealed this 2nd day of July 1974, (SEAL)
Attest:

EDWARD M. FLETCHER,JR.           C.MARSHALL DANN
Attesting Officer                Commissioner of Patents